SIDEBAND SELECTION

Filed Dec. 10, 1956

INVENTOR.
EMANUEL P. ALVERNAZ
BY Lippincott & Smith
ATTORNEYS

United States Patent Office 2,947,860

Patented Aug. 2, 1960

2,947,860

SIDEBAND SELECTION

Emanuel P. Alvernaz, San Jose, Calif., assignor to Jennings Radio Manufacturing Corporation, San Jose, Calif., a corporation of California Filed Dec. 10, 1956, Ser. No. 627,230

5 Claims. (Cl. 250—20)

This invention relates to electrical frequency-selective apparatus useful in communications equipment and the like, and in particular to improved sideband selection circuits for single-sideband communications systems.

In radio and other forms of electrical signaling, the information that is transmitted is frequently represented by a relatively low-frequency electric signal modulated upon a relatively high-frequency signal called the carrier. Such modulation produces two sets of sidebands, commonly called the upper sidebands and the lower sidebands. The upper sidebands, which extend upward in the frequency spectrum from the carrier frequency, have frequencies equal to the sums of the modulating and carrier frequencies. The lower sidebands, which extend downward in the frequency spectrum from the carrier frequency, have frequencies equal to the differences between the modulating and the carrier frequencies. Each set of sidebands occupies a frequency bandwidth equal to that of the modulating signal, which may be about 3 kc. in a typical radio communications system.

Each set of sidebands contains all of the information that has to be transmitted. Accordingly, single-sideband communications systems have been developed in which only one set of sidebands is transmitted faithfully, while the carrier and the other set of sidebands are wholly or partially suppressed. When only one set of sidebands is transmitted, two transmitters can operate on the same carrier frequency without interference, provided one transmitter transmits only the upper sidebands while the other transmitter transmits only the lower sidebands.

Alternatively, a single transmitter may transmit two channels of information simultaneously, one channel of information being transmitted in the upper sidebands while another channel of information is transmitted in the lower sidebands. Thus, single-sideband systems can transmit twice as much information within a given frequency bandwidth as can be transmitted by double-sideband systems. The principles of single-sideband transmission have been known for a long time, and have been used to a considerable extent in radio communication.

The use of single-sideband techniques leads to considerable practical difficulty both in transmitters and in receivers. Both the transmitters and the receivers must have sideband selection circuits that will pass one set of sidebands faithfully without any objectionable degree of distortion while rejecting or greatly attenuating the other set of sidebands and any spurious signals that may be present. Consequently, the sideband selection circuits must have a high degree of frequency selectivity.

Furthermore, particularly in the receiver, it is desirable to have means for changing from the reception of one set of sidebands to the reception of the other set of sidebands by a mere flick of a switch, without retuning or otherwise readjusting any other part of the circuit. The sideband selection circuit preferably should not require retuning nor readjusting when the receiver is tuned from the reception of stations broadcasting on one carrier frequency to the reception of stations broadcasting on another carrier frequency. The sideband selection circuit should be simple and inexpensive, and preferably should be adapted for insertion in existing double-sideband communications equipment to permit single-sideband operation of such equipment, without any major modification of the existing equipment.

This invention provides improved sideband selection circuits that fully meet the above requirements. In brief, the improved circuit consists essentially of a highly selective bandpass filter, two mixer circuits, and an oscillator. The filter bandwidth is just sufficient to pass one set of sidebands. Input signals are heterodyned with a local oscillator signal in one of the mixers to provide difference frequencies such that only one set of sidebands will pass through the bandpass filter. The signals passing through the filter are heterodyned in the second mixer with a signal from the same local oscillator, to provide a signal having the same frequencies as the selected set of sidebands of the original signal.

To change from reception of one set of sidebands to reception of the other set of sidebands, it is only necessary to change the local oscillator frequency. This may be done quite simply, for example by using a local oscillator controlled by either of two piezoelectric crystals, selectively. A simple switch can be provided for connecting either crystal into the oscillator circuit, and by this means the oscillator frequency can be changed by the mere flip of a switch.

The oscillator frequency determines which set of sidebands will be transmitted by the bandpass filter. But it has no effect whatever upon the nominal carrier frequency of the output signal, because this frequency is always exactly the same at the input and output terminals of the sideband selector circuit, regardless of the local oscillator frequency. Consequently, no retuning or other adjustment of any other circuit part is required after a change from reception of one set of sidebands to reception of the other set of sidebands.

The improved sideband selection circuit can be used in a variety of ways and in many different applications where frequency-selective characteristics are required. It can be used in amplitude modulation, frequency modulation, pulse modulation, and other communication systems wherever a high and accurately controlled frequency selectivity is needed. It is especially useful for sideband selection in single-sideband radio apparatus. It can be used in the transmitter so that only one set of sidebands will be transmitted. It can be used in the receiver, preferably inserted into one of the I.-F. portions, for receiving one and rejecting the other of two single-sideband signals transmitted on the same carrier frequency.

Because the nominal carrier frequency at the output of the sideband selection circuit is exactly the same as the nominal carrier frequency at its input, the improved circuit is especially well adapted for insertion into existing radio equipment for converting such equipment from double-sideband to single-sideband operation. Furthermore, it also has exceptional advantages in new equipment, not only because of its simplicity, low cost and superior operation, but also because it can simply be by-passed, by the closing of a switch for example, to change over from single-sideband to double-sideband reception whenever such is desired.

The invention will be better understood from the following detailed description taken in connection with the accompanying drawing, and its scope is pointed out in the appended claims. In the drawing:

Figure 1:
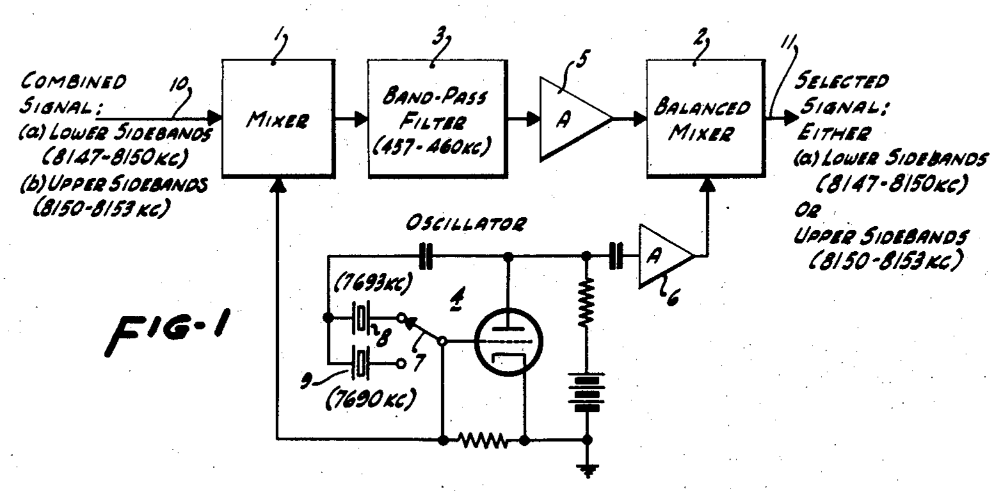
Fig. 1 is a simplified, partly schematic circuit diagram of the novel sideband selection circuit.

Referring to Fig. 1, the sideband selection circuit consists essentially of a mixer 1, a balanced mixer 2, a bandpass filter 3, and an oscillator 4. Two amplifiers 5 and 6 may advantageously be included as shown, not only for signal amplification but also to serve as buffers and to prevent undesirable interactions between input and output portions of the circuit. The mixers, the filters, the oscillators, and the amplifiers are conventional circuits well known to those skilled in the art, and therefore they will not be described in detail. Filter 3 is a highly selective filter having a bandwidth just sufficient to transmit one set of sidebands. For example, it may be a mechanical filter, Collins Radio Co. type F-455-B-31, having a pass band of approximately 457 kc. to 460 kc. Other highly-selective filters, such as crystal lattice filters or high-Q toroid cascade filters, may be employed.

The filter pass band may be located in any convenient part of the frequency spectrum. Generally, the requirement of high selectivity necessitates the use of relatively low filter frequencies. The width of the filter pass band may be more or less than 3 kc., depending upon the communications system in which the apparatus is used. Preferably, the width of the filter pass band is just sufficient to transmit faithfully one complete set of sidebands without objectionable distortion, and the cut-off frequencies (457 kc. and 460 kc., for example) are sharp so that the filter provides a high degree of attenuation to signal components having frequencies just outside of its pass band.

Oscillator 4 is a conventional crystal-controlled oscillator, except that it is provided with a selector switch 7 that is operable to connect either of two piezoelectric crystals 8 and 9 into the oscillator circuit, selectively. Crystals 8 and 9 are ground to have resonant frequencies that differ by an amount substantially equal to the width of the pass band of filter 3. For example, crystal 8 may be ground to provide an oscillator frequency of 7693 kc. and crystal 9 may be ground to provide an oscillator frequency of 7690 kc. Thus the difference between the two oscillator frequencies is numerically the same as the bandwidth of filter 3.

Whenever switch 7 is in the upper position, so that crystal 8 is connected in the oscillator circuit, oscillator 4 supplies electric signals to both of the mixers 1 and 2 at the same frequency of 7693 kc. Whenever switch 7 is moved to its lower position so that crystal 9 is connected in the oscillator circuit, the oscillator still supplies signals of the same frequency to mixers 1 and 2, but in this case the frequency is 7690 kc.

The specific sideband selection circuit illustrated in Fig. 1 was designed to be inserted in the I.-F. portion of a communications receiver having a nominal I.-F. frequency of 8150 kc. Consequently, whenever the receiver is tuned to a given transmitter, the signals that the first detector of the receiver supply to mixer 1 through input lead 10 have a nominal carrier frequency of 8150 kc. (In practice, the carrier is usually suppressed at the transmitter, and is not actually present.)

Now assume that the receiver is tuned to two transmitting stations both broadcasting simultaneously on the same carrier frequency, which the first detector of the receiver reduces to 8150 kc. However, one transmitter broadcasts only the lower modulation sidebands within a frequency band extending downward 3 kc. from the carrier frequency. Therefore the signal received from this first transmitter, hereinafter referred to as signal *a* for convenience, as transmitted from the first detector of the receiver through lead 10, lies within the frequency band between 8147 kc. and 8150 kc. The second transmitter broadcasts only the upper sidebands extending upward in the frequency spectrum 3 kc. from the carrier frequency.

Therefore, the signal from this second transmitter, hereinafter referred to as signal *b* for convenience, as transmitted from the first detector of the receiver through lead 10, lies within the frequency band between 8150 kc. and 8153 kc.

Since the signals that we are discussing are signals within the I.-F. portion of the receiver, their absolute frequencies are independent of the carrier frequency that is actually transmitted. In other words, if the receiver is retuned to two other single-sideband transmitters broadcasting on a different carrier frequency, the two signals *a* and *b* supplied through lead 10 will still fall within the same frequency ranges hereinbefore specified. Thus, signals from any transmitter to which the receiver is accurately tuned are supplied through lead 10 with a nominal carrier frequency exactly equal to the nominal I.-F. frequency of the receiver, in this case 8150 kc.

In mixer 1, signals *a* and *b* are mixed with the signal supplied by oscillator 4, and the difference frequencies are supplied to bandpass filter 3. Assume that switch 7 is in its upper position, so that the oscillator frequency is 7693 kc. In the case of signal *a*, the difference frequencies will lie in the frequency range from 454 kc. to 457 kc., which is outside the pass band of filter 3. Therefore, the difference frequencies corresponding to signal *a* will not pass through filter 3. The difference frequencies corresponding to signal *b* will lie within the frequency range from 457 kc. to 460 kc., which coincides with the pass band of filter 3. Therefore, the difference frequencies corresponding to signal *b* will readily pass through filter 3, and after amplification by amplifier 5 will be supplied to balanced mixer 2. It should be noted that in one position of switch 7 the difference between the carrier frequency of the input signals supplied through lead 10 and the local oscillator frequency is numerically equal to the upper cut-off frequency of filter 3, while in the other position of switch 7 the aforesaid difference is equal to the lower cut-off frequency of filter 3.

In mixer 2, the difference frequencies are again heterodyned with the local oscillator frequency of 7693 kc., and the sum frequencies are supplied to an I.-F. section of the receiver through lead 11. These sum frequencies lie within the frequency range from 8150 kc. to 8153 kc. They are substantially identical to the signal *b* that was supplied to the sideband selection circuit through input lead 10, and have exactly the same frequencies. Signal *a* was rejected and substantially none of the signal *a* was transmitted through the sideband selection circuit to output lead 11.

Now assume that switch 7 is flipped over to its lower position. This changes the local oscillator frequency to 7690 kc. Now the difference frequencies corresponding to signal *a* lie within the range from 457 kc. to 460 kc., and pass through filter 3. The difference frequencies corresponding to signal *b* fall within the range from 460 kc. to 463 kc., and are rejected by filter 3. In mixer 2, the difference frequencies that pass through the filter are heterodyned with the local oscillator frequency of 7690 kc., and the sum frequencies supplied through lead 11 fall within the frequency range from 8147 kc. to 8150 kc. Thus, when switch 7 is in the lower position, signal *a* is transmitted from input lead 10 to output lead 11 without substantial change and at precisely the same frequencies, while signal *b* is rejected.

For circuit simplicity and to accommodate low-level signals with minimum loss of signal-to-noise ratio, mixer 1 preferably is of an unbalanced type of good conventional design. There is no likelihood that signals of the local oscillator frequency or other spurious signals will pass through filter 3, since the difference frequencies that filter 3 transmits are a considerable distance in the frequency spectrum from the oscillator frequency. In the case of mixer 2, there is relatively little difference, percentagewise, between the local oscillator frequency and the desired output frequencies. Therefore, mixer 2 is preferably of a balanced type so that the output signal will not contain any substantial components at the local oscillator frequency. Balanced mixer circuits well known to those skilled in the art may be employed.

Amplifier 5 may be a single stage of voltage amplification that compensates, or somewhat overcompensates, for unavoidable attenuation of desired signal components in transmission through other parts of the circuit. Amplifier 6 may be a cathode follower stage that prevents undesirable loading of oscillator 4 by mixer 2 and also serves as a buffer to prevent undesirable coupling between output and input circuits through the oscillator connections.

There are several features of the new sideband selection circuit that should be carefully noticed. One important feature is that there is no net change in frequency of the transmitted signal components between input lead 10 and output lead 11. This is quite important for several reasons. One reason is that it permits the insertion of the new circuit into existing communications equipment without any major alterations or modifications of the existing equipment, since there is no change in frequency of the transmitted signal. Furthermore, it permits the use of a simple switch to by-pass the sideband selection circuit whenever double sideband operation is desired, without any necessity for returning or readjusting any other part of the circuit when changing from single-sideband operation to double-sideband operation and vice versa.

Another feature is that there is no change in the output nominal carrier frequency when changing from upper-sideband operation to lower-sideband operation and vice versa. Consequently, changes from one condition of operation to another can be made simply by flipping a switch, without any returning or readjustment of any other part of the circuit.

Another feature is that filters of any desired selectivity, having pass bands within any desired portion of the frequency spectrum, can be employed, and at the same time the sideband selection circuit can be inserted in I.-F. or R.-F. portions of a communications system operating in any desired portion of the frequency spectrum. All that is required is that the frequency of local oscillator 4 be appropriately chosen so that the difference-frequency signals supplied to filter 3 by mixer 1 and corresponding to the desired sidebands will fall within the pass band of the filter.

Figure 2:
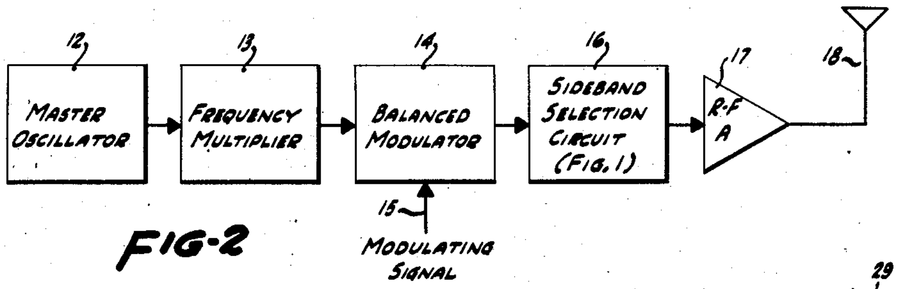
Fig. 2 is a simplified block diagram of a radio transmitter incorporating the novel sideband selection circuit.

Fig. 2 illustrates how the improved sideband selection circuit may be used in a single-sideband radio transmitter. A conventional master oscillator 12 and frequency multiplier 13 supply an electric signal at the carrier frequency to a balanced modulator 14. A relatively low-frequency modulating signal is supplied to the balanced modulator through lead 15. The carrier frequency is suppressed at the output of the balanced modulator, and accordingly the output signal from balanced modulator 14 consists of two sets of sidebands, the upper sidebands extending upward in the frequency spectrum from the carrier frequency, and the lower set of sidebands extending downward in the frequency spectrum from the carrier frequency.

The two sets of sidebands are then supplied to a sideband selection circuit 16, which may be like the circuit shown in Fig. 1, with appropriate changes in the oscillator frequencies if the carrier frequency is other than 8150 kc. or the cut-off frequencies of the band-pass filter are other than 457 kc. and 460 kc. In case the transmitter is always to transmit the same set of sidebands, the local oscillator of this sideband selection circuit need have only one crystal to control its frequency. However, it is often desirable to design the transmitter so that it may, whenever required, transmit either the upper or the lower sidebands. In this case the oscillator of circuit 16 would have two crystals that can be connected into the oscillator circuit selectively as hereinbefore described. The selected set of sidebands passes through circuit 16 to a conventional R.-F. amplifier 17, and then to a conventional radio transmitting antenna 18. Whenever double-sideband transmission is desired, it is only necessary to by-pass the sideband selection circuit.

This arrangement is novel and advantageous in several respects over means heretofore used to obtain single-sideband transmission. The sideband selection circuit causes no change in frequency of the signal components that it transmits, and it may be inserted in any portion of the transmitter circuit, such as the R.-F. portion operating at broadcast frequency. Consequently, the sidebands do not have to be generated at low frequencies and then multiplied up to broadcast frequency, as heretofore has generally been the case. A simple and relatively inexpensive circuit gives superior performance. The unwanted sidebands are rejected with an exceptionally high degree of attenuation, and there is no substantial likelihood that undesired spurious signals may be transmitted.

By means of this invention, relatively simple and inexpensive transmitters can be adapted for single-sideband operation, and two transmitters can operate simultaneously at the same carrier frequency without substantial interference.

Or, if desired, one transmitter can simultaneously transmit two channels of information, one as a set of upper sidebands and the other as a set of lower sidebands. For example, this may be accomplished by a simple modification of the transmitter shown in Fig. 2. A second balanced modulator in series with a second sideband selection circuit may be connected in parallel with balanced modulator 14 and sideband selection circuit 16, so that frequency multiplier 13 will supply a carrier-frequency signal to both of the two balanced modulators simultaneously, and the two sideband selection circuits will simultaneously supply signals to R.-F. amplifier 17. One of the modulating signals to be transmitted may be supplied to one balanced modulator, and the other modulating signal may be supplied to the other balanced modulator. One sideband selection circuit will be adjusted to transmit the upper sidebands of the signal from one balanced modulator, and the other sideband selection circuit will be adjusted to transmit the lower sidebands of the signal from the other balanced modulator.

Figure 3:
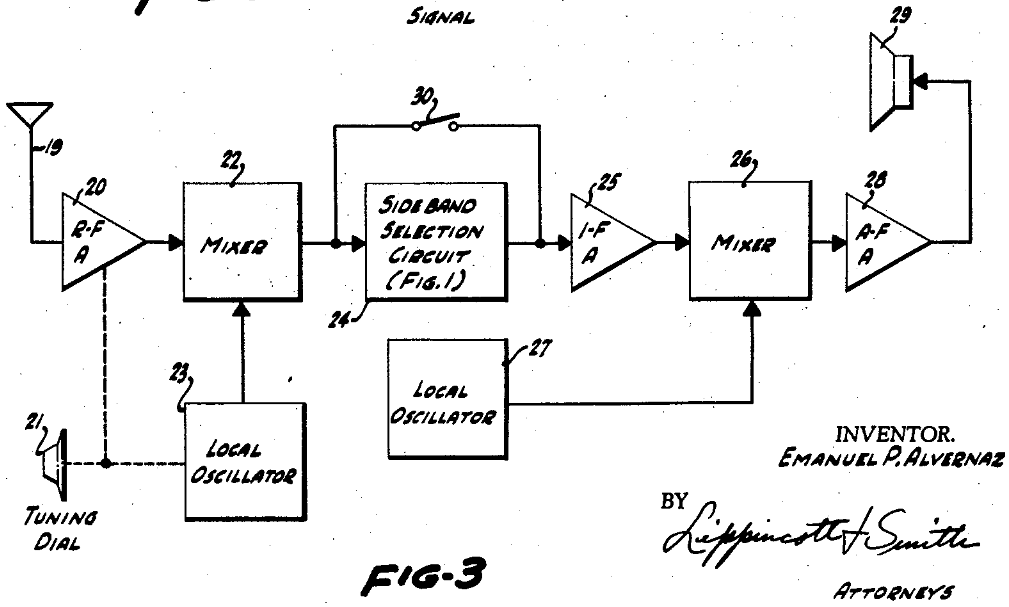
Fig. 3 is a simplified block diagram of a radio receiver incorporating the novel sideband-selection circuit.

Fig. 3 illustrates how the improved sideband selection circuit can advantageously be used in a radio communications receiver. A conventional radio receiving antenna 19 supplies received signals to a conventional R.-F. amplifier 20, which may be tuned by a conventional tuning dial 21. The amplified signals are heterodyned in a mixer 22 with a signal from a local oscillator 23 that is also tuned by dial 21, so that mixer 22 supplies difference-frequency signals (at substantially the intermediate frequency of the receiver) corresponding to the signals broadcast by the transmitters to which the receiver is tuned. The receiver may, for example, be tuned to two single-sideband transmitters operating simultaneously on the same carrier frequency, but one broadcasting upper sidebands while the other broadcasts lower sidebands. Because the selectivity of the R.-F. amplifier 20 and mixer 22 is rather broad, the difference-frequency signals provided by the mixer have components corresponding to the signals received from both single-sideband transmitters.

The difference-frequency signals are supplied to a sideband selection circuit 24, which may be identical to the circuit shown in Fig. 1. If the I.-F. frequency of the receiver is other than 8150 kc., or if the pass band of the filter lies between cut-off frequencies other than 457 kc. and 460 kc., appropriate changes can be made in the two crystal-controlled frequencies of the sideband selection circuit oscillator. As hereinbefore explained, signals corresponding to only one set of sidebands pass through the sideband selection circuit to I.-F. amplifier 25. In a conventional mixer circuit 26, the I.-F. signals are heterodyned with a signal at the nominal I.-F. frequency of the receiver supplied by a local oscillator 27, to provide difference-frequency signals that are amplified by A.-F. amplifier 28 and supplied to a loudspeaker 29 or other output transducer.

Since the sideband selection circuit 24 is in the I.-F. portion of the receiver, the signals supplied to it always have the same nominal carrier frequency and it is not necessary to retune or otherwise readjust the sideband selection circuit when the receiver is tuned from one R.-F. channel to another by tuning dial 21. Either the upper-sideband signals of the lower-sideband signals can be received selectively, simply by flipping the switch within the sideband selection circuit as hereinbefore explained. Since the signal components that pass through the sideband selection circuit have the same frequencies at the input and output ends of the sideband selection circuit, there is no need to retune or readjust any other part of the receiver when changing from upper-sideband reception to lower-sideband reception and vice versa. Furthermore, whenever double-sideband reception is desired, it is only necessary to close a switch 30 by-passing the sideband selection circuit, and to disconnect or otherwise turn off the sideband selection circuit 24.

If we consider an amplifier which is used for single channel communication, we can increase its capabilities by using this mixing system. Actually for each channel a filter, 2 mixers and an oscillator at a different frequency from any other oscillator is necessary. The spacing is to be equal to the channel spacing in kilocycles. The advantage lies in the fact that present systems require different filters for each channel to be used. Each channel in the system having a pass band of frequencies slightly different from the filters being used on adjacent channels. With this system all filters may be identical with the same pass band characteristics. The separation of channels on output frequencies into the R.-F. amplifier is accomplished by the simple method of having crystal controlled oscillators which feed signals into two mixers used in this system and spaced frequency-wise the desired amount of kilocycles required for the channel separation.

It should be understood that this invention in its broader aspects is not limited to specific embodiments herein illustrated and described, and that the following claims are intended to cover all changes and modifications that do not depart from the true spirit and scope of the invention.

What is claimed is:

1. A side band selection circuit comprising a first mixer, a bandpass filter having a restricted frequency pass band, a second mixer, an adjustable fixed frequency oscillator connected to supply two signals of the same frequency to said first mixer and said second mixer respectively, said frequency being outside the passband of said filter, means for supplying to said first mixer two input electric signals simultaneously, said two input signals being the upper modulation sidebands and the lower modulation sidebands respectively of the same carrier frequency, said first mixer heterodyning said input signal with the signal supplied thereto by said oscillator for producing a first set of difference-frequency signals having frequencies equal to the frequency differences between the upper-sideband input signal and the signal supplied by said oscillator and a second set of difference-frequency signals having frequencies equal to the frequency differences between the lower-sideband input signal and the signal supplied by said oscillator, means for conveying said difference-frequency signals from said first mixer to said filter, only one of said sets of difference frequencies lying within the pass band of said filter and passing through said filter, means for conveying the signals that pass through said filter to said second mixer, said second mixer heterodyning the last-mentioned signals with the signals supplied thereto by said oscillator for producing sum-frequency signals having frequencies identical to the frequencies of only one of said input signals.

2. A sideband selection circuit comprising a first mixer, a band-pass filter having a pass band lying between a lower cut-off frequency and an upper cut-off frequency, a second mixer, means for conveying electric signals from said first mixer to said filter and from said filter to said second mixer, an oscillator connected to supply simultaneously two signals of the same frequency to said first mixer and said second mixer respectively, means for supplying to said first mixer two input electric signals simultaneously, said two input signals being the upper modulation sidebands and the lower modulation sidebands respectively of the same carrier frequency, the difference between said carrier frequency and the frequency of said signals supplied by said oscillator being substantially equal to one of said cut-off frequencies, whereby said second mixer supplies electric signals identical in frequency to only one of said input signals.

3. A sideband selection circuit comprising a first mixer, a band-pass filter having a pass band lying between a lower cut-off frequency and an upper cut-off frequency, a second mixer, means for conveying electric signals from said first mixer to said filter and from said filter to said second mixer, an oscillator connected to supply simultaneously two signals of the same frequency to said first mixer and said second mixer respectively, means for supplying to said first mixer two input electric signals simultaneously, said two input signals being upper modulation sidebands and the lower modulation sidebands respectively of the same carrier frequency, and means in said oscillator for changing the frequency of said signals supplied by the oscillator to either of two fixed values selectively, one of said values being such that the difference between said carrier frequency and the frequency of said signals supplied by said oscillator is substantially equal to said lower cut-off frequency, and the other of said values being such that said difference is substantially equal to said upper cut-off frequency, whereby said second mixer supplies electric signals identical in frequency to either one of said input signals, selectively.

4. A single-sideband radio transmitter comprising means for generating radio-frequency electric signals, a balanced modulator, a single-sideband selection circuit, and transducing means for converting radio-frequency signals into radio waves, all connected in tandem in the order named, said modulator being operable to modulate said radio-frequency signals for producing a set of upper modulation sidebands and a set of lower modulation sidebands, said sideband selection circuit passing only one of said sets of sidebands from said modulator to said transducing means without any net change in frequency, said sideband selection circuit consisting essentially of a first mixer, a band-pass filter having a frequency band substantially equal to a modulation sideband, a second mixer, and an oscillator, said first mixer, filter and second mixer being connected in tandem in the order named, said oscillator being connected to supply signals of the same frequency to both of said mixers simultaneously with the frequency of said oscillator signals being substantially equal to the difference between the frequency of said radio frequency electrical signals and the upper or lower cut-off frequency of said band-pass filter.

5. A radio receiver comprising tunable means for converting electric signals from radio frequency to intermediate frequency, a sideband selection circuit and an intermediate-frequency amplifier connected in tandem for transmitting said signals of intermediate frequency without any net frequency change, and means for converting said signals from intermediate frequency to audio frequency, said sideband selection circuit consisting essentially of a first mixer, a band-pass filter, a second mixer, and an oscillator, said first mixer, said filter and said second mixer being connected in tandem in the order named, said oscillator being connected to supply signals of the same frequency to said two mixers simultaneously.

References Cited in the file of this patent

UNITED STATES PATENTS

| | | |
|---|---|---|
| 2,529,443 | Bach | Nov. 7, 1950 |
| 2,629,818 | Bailey | Feb. 24, 1953 |
| 2,654,832 | Robinson | Oct. 6, 1953 |
| 2,671,850 | Marcou | Mar. 9, 1954 |
| 2,800,580 | Davies | July 23, 1957 |